US006713754B1

United States Patent
Mueller

(10) Patent No.: US 6,713,754 B1
(45) Date of Patent: Mar. 30, 2004

(54) DEVICE AND METHOD FOR EXPOSING VISUAL DATA ON LIGHT-SENSITIVE RECORDING MATERIAL

(75) Inventor: Peter Mueller, Germering (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/368,477

(22) Filed: Aug. 4, 1999

(30) Foreign Application Priority Data

Aug. 11, 1998 (DE) .......................... 198 36 337

(51) Int. Cl.$^7$ ................................ G01J 3/50

(52) U.S. Cl. ................................ 250/226

(58) Field of Search ............... 250/226, 227.18, 250/227.21

(56) References Cited

U.S. PATENT DOCUMENTS 4,899,224 A 2/1990 Ooba et al.

FOREIGN PATENT DOCUMENTS

| DE | 19733370 | 2/1999 |
| DE | 19746224 | 5/1999 |
| EP | 0691568 | 1/1996 |
| EP | 0713330 | 5/1996 |
| JP | 1186352 | 7/1989 |

*Primary Examiner*—Frank G. Font
*Assistant Examiner*—Andrew H. Lee
(74) *Attorney, Agent, or Firm*—Milde & Hoffberg, LLP

(57) ABSTRACT

A device and a method for exposure of visual data onto light-sensitive recording material, a light source which emits light in at least one color, and a control unit for regulating the light amount. The control unit is connected to a light measuring unit. The light measuring unit has at least two detectors, which measure at least two different spectral components of the same exposure color. The control unit and the light measuring device form a closed loop control circuit.

20 Claims, 3 Drawing Sheets

DEVICE AND METHOD FOR EXPOSING VISUAL DATA ON LIGHT-SENSITIVE RECORDING MATERIAL

BACKGROUND OF THE INVENTION

The present invention relates to a digital image generator and to a method for exposing light-sensitive material. The image generator comprises a light source that emits light in at least one color, a control unit connected to the light source for regulating the quantity of emitted light and a light measuring device, connected to the control unit. The control unit and the light measuring device form a control circuit for the image generator.

The published European patent application No. EP-OS 0 691 568 describes a photographic illuminator in which LEDs are provided as light sources. This reference explains that brightness differences of individual LEDs, leading to local inhomogeneities of the light source, are to be corrected. The way this is done is that point-by-point, in three colors (red, blue and green), the light that penetrates through a developed, non-illuminated test negative, is measured during photographic printing. The photometry data thus determined are used to adjust the individual LEDs so that the negative to be printed is then exposed uniformly.

It has been shown, however, that such a single-test procedure is insufficient. The LEDs are subjected to brightness fluctuations before each switch-on process. These fluctuations are dependent on the switch-on duration, and can lead to great quality impairment in the copy. The aforementioned EP-OS 0 691 568 proposes to remedy this problem by having LED characteristic parameters adopted and put into memory, conveying the connection between switch-on duration and brightness fluctuations for various LED brightnesses. These parameters must then additionally be allowed for in LED controls. One such parameter must be adopted and placed in memory for each LED initial brightness and switch-on duration that appears.

The published German patent application No. DE 197 33 370 describes a digital illumination system in which a color picture is generated by means of an exposure unit and a pixel-by-pixel controllable light modulator. The image is then exposed as an index print on photographic paper. LEDs are used here for exposing the light modulator, since they have a long service life and can be switched very quickly. This obviates the requirement of a locking device, which is necessary with other light sources.

The published German patent application No. DE 197 46 224 also uses LEDs of various colors as an illumination device for a light modulator, here a DMD (digital micromirror device). The DMD is used here to generate a blurred mask, which thus is a modified copy of the pattern. With the mask, the pattern for copying photographic films is superimposed, to reduce large-area contrast in the copy.

High quality is currently demanded of copied color pictures. This makes it necessary to measure and compensate for all brightness fluctuations of the light source that depend on switch-on duration. The correction proposed in the published European patent application No. EP-OS 0 631 568, using characteristic parameters, is too costly for this purpose. Additionally, it has been determined that clearly visible density fluctuations appear in spite of compensation according to the EP-OS 0 631 568.

SUMMARY OF THE INVENTION

Therefore, the principal object of the present invention is to provide a device and method for exposing an image onto light-sensitive material so that the brightness of copier light can be sufficiently controlled to result in uniform exposure. Regulation is to be implemented in a simple manner so that all fluctuations in copier light are counterbalanced so that they do not break down in the copied image as density fluctuations.

This object, as well as other objects which will become apparent from the discussion that follows, are achieved, in accordance with the present invention, by providing a device and method for measuring at least two different spectral components of the same exposure color and for calculating the control parameters from the measured values.

It can be shown that in light emitters such as LEDs or laser diodes, during their switch-on period, not only brightness changes, but also their emission bands are subjected to a spectral shift. This means that during an LED switch-on period, a change occurs in the range in which its emission spectrum overlaps with the spectral range containing the corresponding sensitivity maximum of the photographic paper. Even if the operating current is post-adjusted during the switch-on period, so that the brightness remains constant, this spectral shift manifests itself as density fluctuations in reproducing an image.

In red LEDs, this spectral shift can amount to 6 nm in the direction of greater wavelengths during the switch-on period. In exposing AGFA CN photographic paper to a GaAlAs LED, the emission spectrum, for example, shifts in the direction of the red sensitivity maximum. At the same time, the LED intensity drops.

If a uniform density distribution is to be achieved on the photographic paper, the LED must be regulated while allowing for both effects.

Only when the brightness as well as the wavelength shift of emitted light can be determined, and the light emitter can be regulated while allowing for the spectral position of the sensitivity maxima, can the light-sensitive material be exposed correctly. In what follows, this regulation is designated as regulation of the "effective brightness."

In invention-specific terms, the device is connected to a measuring instrument. This instrument uses at least two detectors for an exposure color (for example, red, green or blue) to record the brightness of the emitted light in at least two different spectral components of this color.

The shift of the red LED (the other colors can be treated the same way) can be determined, for example, as follows:

A first, non-filtered detector measures detector voltage $U_1$, which in a first approximation, is directly proportional to the overall LED intensity emitted in red. A second detector is equipped with a bulk glass filter, translucent only for the longest wavelength portion of the red emission spectrum. Thus the detector voltage $U_2$ is proportional to the emitted intensity on the long wave edge of the red spectrum. If, during the LED's switch-on process, the spectrum of the red LED is shifted to longer wavelengths, then detector signal $U_2$ increases, while $U_1$ stays unchanged as the standard for the maximum intensity. Thus, the relationship $U_1/U_2$ provides information about the spectral condition of the emission.

The brightness to be regulated as a function of the intensity $U_1$ and the spectral shift of the emission $\delta\lambda$ thus yields approximately $$I_{\textit{eff}}(\delta\lambda) = U_1 \Phi(U_2/U_1)$$

If the characteristic function $\Phi$ is developed for the spectral sensitivity of the photographic paper according to powers from $U_2/U_1$, there is obtained:

$$I_{\textit{eff}}(\delta\lambda) = U_1(A + B(U_2/U_1) + C(U_2/U_1)^2 + \ldots)$$

with the paper-specific constants A, B, C.

In the simplest case it suffices to obtain $$I_{\mathit{eff}}(\delta\lambda) \approx U_1 A + U_2 B = \text{constant},$$

thus to measure with two sensors $U_1$ and $U_2$, to attain a satisfactorily uniform density rise in illuminating the photographic paper.

Constants A and B must be predetermined for each possible paper type and stored in a lookup table (LUT).

To attain a still more precise regulation of the exposure amount, more than two sensors per color can be used. By means of the additional measured quantities, detailed changes in the emission bands, such as their widening, can then be documented and allowed for.

This regulation in accordance with sensitivity always allows for the current conditions. Therefore, compensation is made for automatic aging effects of the exposure device as well as environmental influences that affect its radiation behavior. Also, the lighting unit can be replaced without necessitating recalibration of the exposure regulator.

In particular, shortly after switching the light source on, spectral change is evident. Therefore it is essential to correct these temporal changes right upon being printed, obviating mechanical locks by constantly switching rapidly switchable light emitters on and off. Also in digital photographic mini-labs, as well as index print systems, printers in the medical field, etc., fast operational sequences and thus short switching times for image generator devices are becoming increasingly important, because corrections are becoming ever more necessary.

Generally it can be assumed that in all highly heated light sources, a spectral shift of emitted light takes place because of heating. If the heating of this device cannot be prevented by cooling or rapid heat removal, then correction of luminous intensity, based on measurement of spectral shift of the emitted light, is urgently needed.

In photographic printers, this can become a problem if various-color LEDs are used for printing negatives onto color photographic stock (paper). For one thing, these LEDs have an advantage in that they can be switched very rapidly. For another, they can be regulated directly in every color, so that color copier light generated by them can be adjusted directly to the spectral sensitivity of the photographic paper, without having to insert additional color filters into the ray path.

Fast-switch LEDs or laser diodes can also be used, such as the vacuum fluorescence printer head (VFPH) described in the European Patent No. EP 0 713 330 A1, in order to expose digital image data directly onto the photographic paper. In this case, the regulation according to the invention can be used to advantage.

Photographic paper, transparency screens or thermographic material are suitable as light-sensitive material for imaging digital pictures, along with all other materials which have light-sensitive color substances.

Light emitters, laser diodes, and all other normal light sources can also be used as exposure units in an image generator, whereby the light generated by the emitters or diodes is then modulated by means of a light modulator. Depending on the controls of the light modulator, an image is then generated, or the copier light for a negative to be copied is modified (for example, with fuzzy masking, color masking, or for compensation of color wobbles). In such image generators, the invention-specific exposure regulation can be done either through directly influencing the exposure unit or—if colors are to be exposed consecutively—by allowing for the spectral shift, and thus changing the effective brightness of the particular images to be exposed during light modulation with the light modulator.

Examples of light modulators such as LCDs, TFT-LCDs, PLZTs, FLCDs, or similar devices are used. All these light modulators have a disadvantage in that they use polarized light, thus leading to heavy light losses. Also, in part they switch too slowly for operation in today's fast printers.

A DMD is superior because it switches very rapidly and does light transmission directly. It performs temporal modulation of the light by switching mirror units on and off pixel by pixel. The DMD's electronic controls permit secure switching intervals to be pre-set. These can be added on in order to generate various density levels on the material to be exposed. To ensure uniform picture impression, it is necessary that at all equally long switching intervals, the same quantity of light be transferred to the material. Therefore, it is essential in such light modulators to keep effective brightness in the illuminator device constant. Thus, there is an urgent need to regulate the light source in accordance with the invention, based on the measurement of brightness fluctuations and spectral shift, if density fluctuations in the image are to be avoided.

The measuring device which determines the measured parameters for regulating brightness of an image generation device consists of several units. These units have sensors with varied spectral sensitivity. Photodiodes, transistors, CCDs, pyroelectric detectors or similar known detectors can be used as sensors.

In order to measure the different spectral components of a color, there must be at least two sensors present for each color. These sensors can either have varied spectral sensitivities; or measure varied spectral components of the light amount via color filters placed on the side closer to the radiation source; or be spatially separated, so that spatially spectrally separated light is measured at various locations. The light can be spectrally separated by prisms, partially translucent mirrors, grids or other optical components. It is also possible to measure the overall light of all colors to be regulated, using one sensor. With each second measuring unit per color, the long-wavelength or short-wavelength or some other spectral component of the light quantity of a color can be determined.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
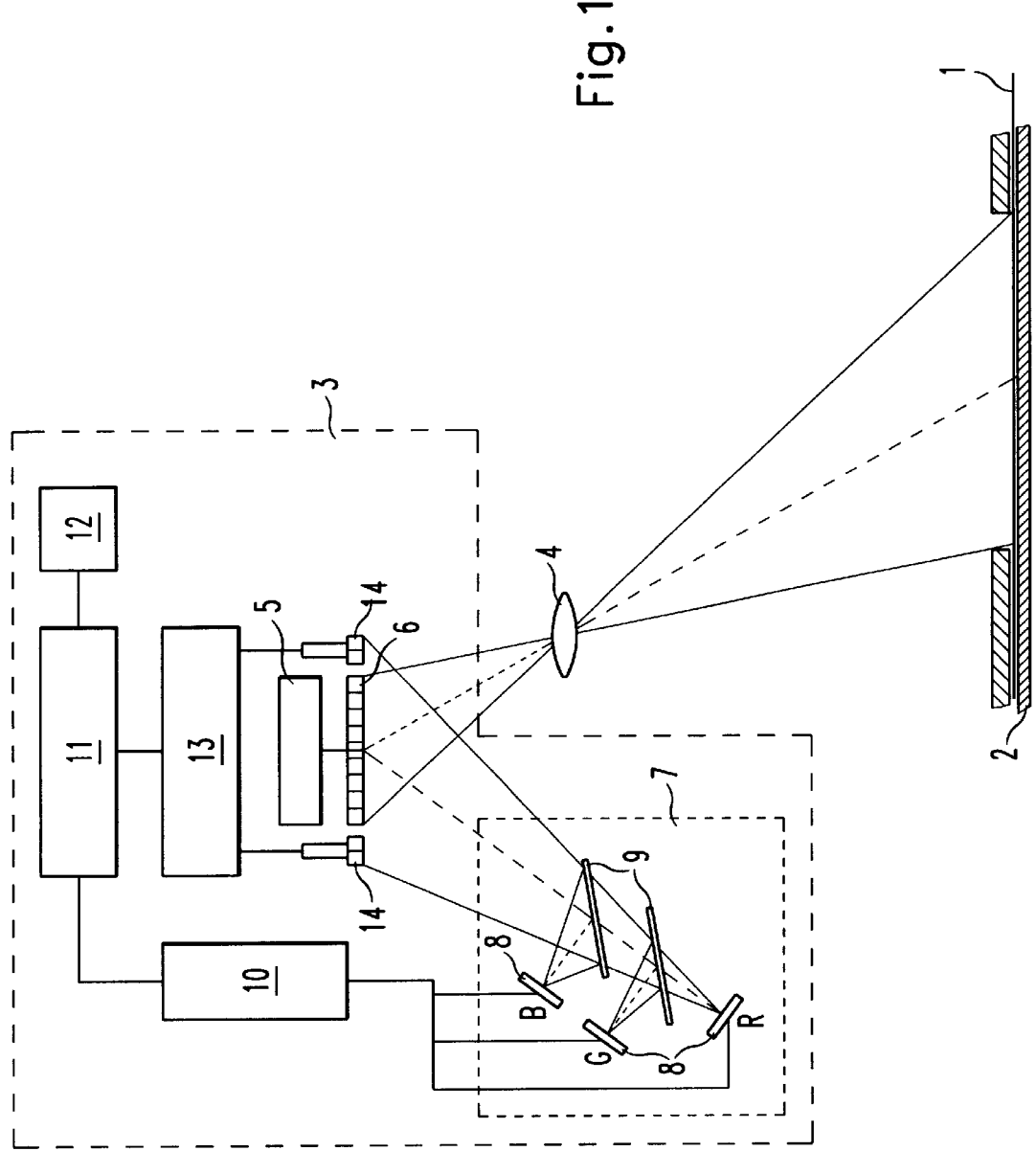
FIG. 1 is a representational diagram of a picture recreation device with a digital image generator that is controlled in accordance with the invention.

The preferred embodiments of the present invention will now be described with reference to FIGS. 1–4 of the drawings. Identical elements in the various figures are designated with the same reference numerals.

FIG. 1 shows an image printing device, by means of which, a digital image is exposed onto photographic paper 1, which is in a paper tray 2. The digital image is generated by the image generator 3, and copied via a lens 4 onto the photographic paper 1. A control device 5 regulates a DMD 6 pixel by pixel in dependence of the digital image data, so that, when modulated, the light of exposure device 7 is reflected to lens 4.

For the lighting device, individually switched LED arrays 8 are used in three colors, whose light is collected via dichroic mirrors 9.

The amount of light that is emitted by the lighting device is regulated by a control device 10. The momentary regulator current for the LED arrays 8 is determined in a computer 11. To calculate these currents, specific values for the photographic paper 1 are used from a look-up table (LUT) 12, which is computed with measurement quantities of a light measuring device 13. The measuring device 13 has several photodiodes 14, which are placed so as to surround DMD 6.

Figure 2:
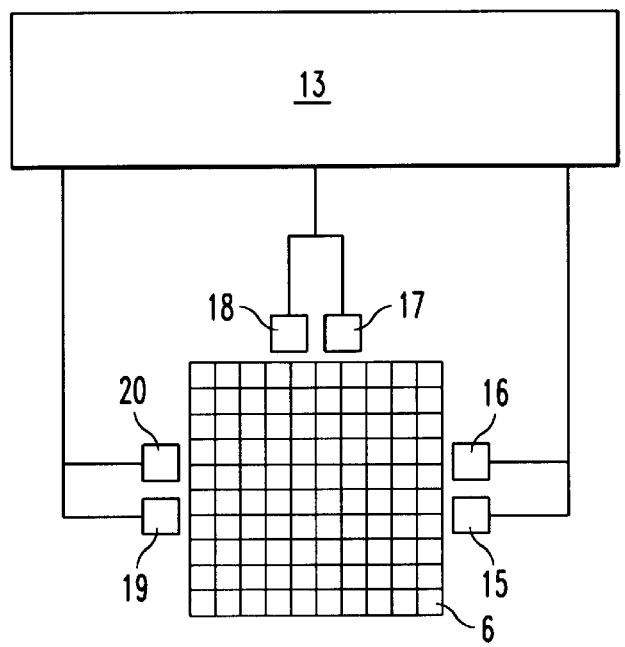
FIG. 2 is a representational diagram of a measurement device with several detectors that are arrayed in the vicinity of a light modulator that can be controlled, pixel by pixel.

One advantageous configuration of detectors is depicted in FIG. 2. For each of the three colors to be exposed, on each side of DMD 6, two photodiodes are provided. It is advantageous to always have two photodiodes next to each other, of which one determines the entire light amount, and the other determines the light amount of a color's spectral component. Thus, for example, photodiode 15 measures the entire light quantity of all colors, while photodiode 16 has a filter placed between it and the light source, so that it can measure only a certain component (such as the long-wavelength component) of the amount of light emitted in red.

Photodiodes 17 and 19, like diode 15, measure the entire light amount. Similarly, photodiodes 18 and 20 use a filter to measure only a green and a blue component of the entire light amount.

This arrangement is advantageous in that the entire light amount is always measured at the same place, as are the spectral components. If one declines to use this advantage, then it would also be conceivable to use only one diode to measure the entire light amount, thus permitting elimination of two sensors.

Figure 3:
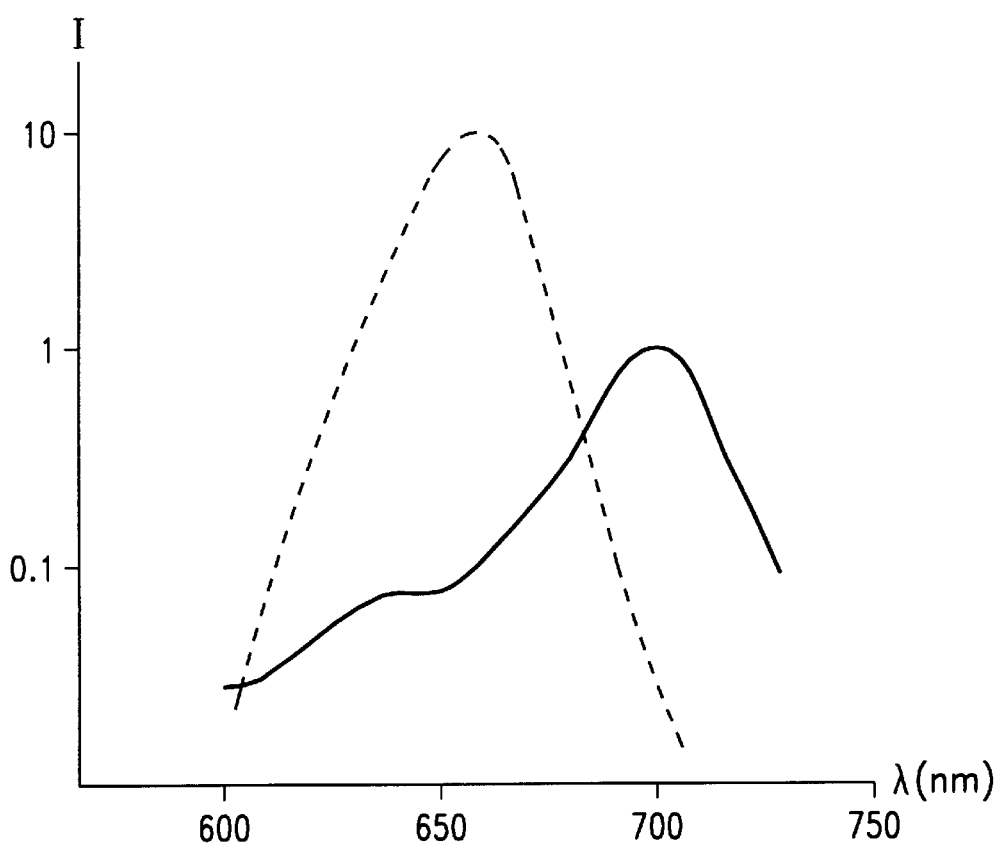
FIG. 3 is a graph showing the emission spectrum of typical red LEDs, compared with the sensitivity curve of a typical photographic paper.

FIG. 3 shows the emission spectrum of a GaAlAs LED (dashed), compared with the sensitivity curve of AGFA CN photographic paper (continuous), as measured by wavelength. In order to make the amounts comparable, the emitted intensity has been standardized to 10. The sensitivity curve of the photographic paper is in the long-wavelength range of the emitted spectrum. Therefore, the exposure is more effective, if the spectrum is shifted to the right owing to LED heating.

Figure 4:
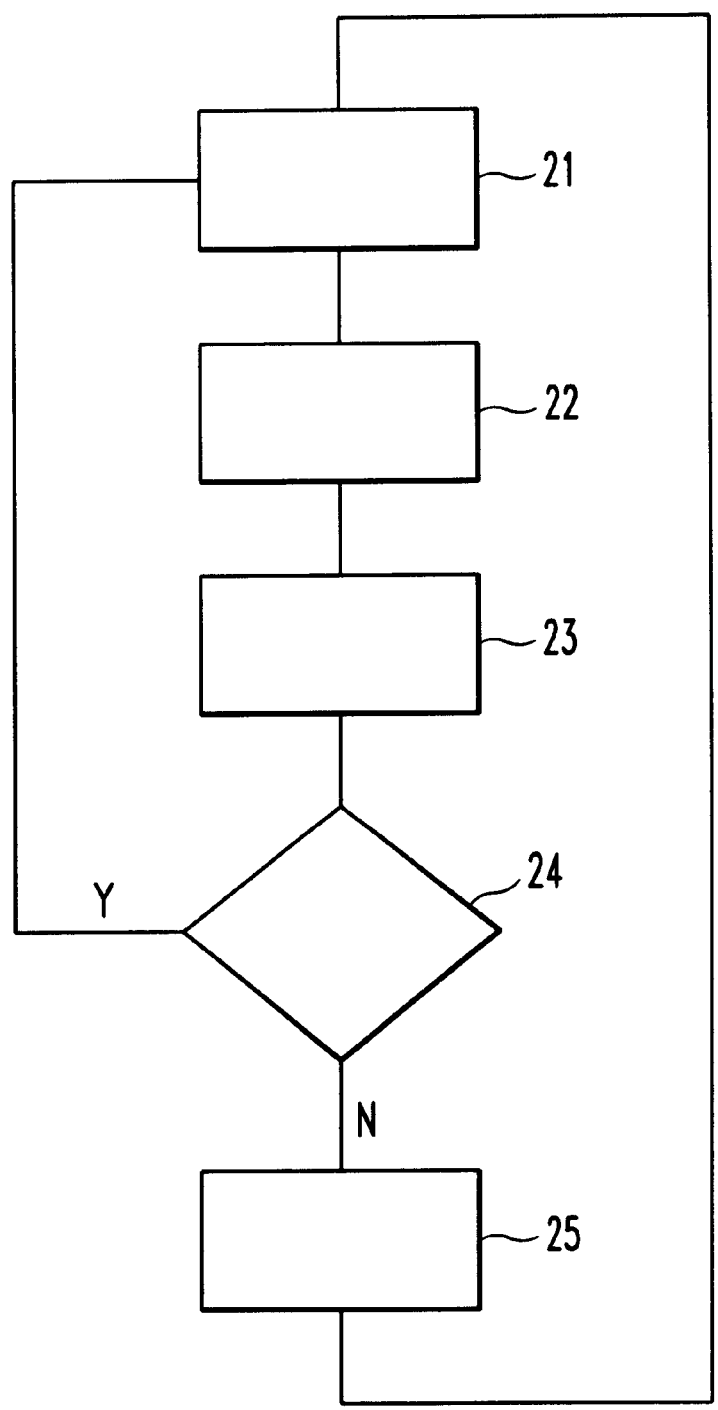
FIG. 4 is a flow chart of a software program used in the control unit employed with the digital image generator of the present invention.

FIG. 4 is a flow chart detailing the operation of the picture recreation device of FIG. 1. In the first step, represented by the first block 21, at least two detector voltages $U_1$ and $U_2$ of the photodiodes 14 are stored. As explained above, the detector voltages $U_1$ and $U_2$ represent the intensity of light at prescribed wavelengths.

In block 22, these voltages, stored in the measuring device 13, are supplied to the computer 11. In block 23, the computer 11 calculates the effective intensity $I_{eff}$ for the specific values A and B of the photographic paper to be exposed. In a simplified approximation, this calculation proceeds according to the formula:

$$I_{eff} \approx AU_1 + BU_2$$

This actual value for the effective intensity is compared, in block 24, with the desired value $I_{effs}$ which is necessary to effect the desired photographic density on the photographic paper. If these two intensities are not equal, the control current for the LEDs is varied in step 25 and the procedural steps are carried out again, commencing with block 21. If the two intensities are equal, the imaging step is carried out and then the system returns to block 21.

There has thus been shown and described a novel device and method for exposing visual data on light-sensitive recording material which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a device for exposing image data onto light-sensitive recording material, said device comprising a light source that emits light in at least one color, a control unit connected to the light source for regulating the quantity of emitted light, and a light measuring device, connected to the control unit, said control unit and said light measuring device forming a control circuit, the improvement wherein the measuring device has at least two detectors which measure at least two different spectral components of the same color.

2. The device according to claim 1, wherein the control circuit is a closed loop circuit.

3. The device according to claim 1, wherein the light source includes LEDs.

4. The device according to claim 1, wherein the light source has a vacuum fluorescence printer head (VFPH).

5. The device according to claim 1, wherein the light source includes a light modulator.

6. The device according to claim 5, wherein the light modulator is a DMD.

7. The device according to claim 1, wherein the two detectors of the measuring device have different spectral sensitivity.

8. The device according to claim 1, wherein at least one of the two detectors of the measuring device includes a color filter.

9. The device according to claim 1, wherein the two detectors of the measuring device include photodiodes.

10. The device according to claim 1, wherein the control unit is coupled to a look-up table, which contains specific values for the light-sensitive recording material, and wherein said control unit regulates the quantity of emitted light in dependence upon said specific values.

11. The device according to claim 1, wherein one of the spectral components contains spectral wavelengths from all of the exposure colors to be regulated, and all other spectral components each contain a spectral wavelength band of only one exposure color.

12. The device according to claim 1, wherein the spectral components contain two different spectral wavelength bands from the spectral range of each exposure color to be regulated.

13. In a method for exposing image data onto light-sensitive recording material, whereby a light source emits light in at least one exposure color, the emitted light is measured, and the light source is regulated according to measured light, the improvement comprising the steps of:

measuring at least two different spectral components of the same exposure color and calculating control parameters from the measured values.

14. The method according to claim 13, wherein two different spectral components are measured by separate detectors.

15. The method according to claim 11, wherein light is generated by LEDs.

16. The method according to claim 15, wherein the overall brightness of the LEDs is regulated.

17. The method according to claim 15, wherein the LEDs are individually regulated.

18. The method according to claim 15, wherein the light emitted by the LEDs is regulated by a light modulator, depending on image content.

19. The method according to claim 13, wherein one of the spectral components contains spectral wavelengths from all of the exposure colors to be regulated, and all other spectral components each contain a spectral wavelength band of only one exposure color.

20. The method according to claim 13, wherein the spectral components contain two different spectral wavelength bands from the spectral range of each exposure color to be regulated.

* * * * *